Oct. 14, 1930.  W. A. NELSON  1,778,641
VIBRATION DAMPER
Filed Dec. 27, 1926

INVENTOR.
WILLIAM A. NELSON.
BY HIS ATTORNEYS.

Patented Oct. 14, 1930

1,778,641

UNITED STATES PATENT OFFICE

WILLIAM A. NELSON, OF MINNEAPOLIS, MINNESOTA

VIBRATION DAMPER

Application filed December 27, 1926. Serial No. 157,287.

This invention relates to a device for counter-acting or damping the torsional vibration set up in the crank shaft of an engine having a plurality of cranks. With such a crank shaft, particularly those used in internal combustion engines, there is torsional vibration often set up in the shaft, due to the movements of the pistons and the connecting rods. Such vibrations often cause great torsional strains or twists in the crank shaft and the crank shaft has a tendency to move or be twisted in a direction reverse to its direction of rotation.

It is an object of this invention, therefore, to provide a very simple and efficient means connected to and driven from the crank shaft for damping or counter-acting the torsional vibrations and strains produced in the crank shaft.

It is another object of the invention to provide a device for counter-acting or damping the torsional strains and vibrations produced in the crank shaft, comprising a rotating member frictionally engaged and driven by another member which is driven from said crank shaft, said rotating member driving a weighted member.

It is still another object of the invention to provide a device for damping or counter-acting the torsional vibration and strains produced in the crank shaft comprising a rotatable member having mounted therein outwardly swinging arms yieldingly urged into engagement with another rotating member which is in turn driven from said crank shaft.

These and other objects and advantages of the invention will be fully set forth in the following description made in connection with the accompanying drawings, in which like reference characters refer to similar parts throughout the several views and in which:—

Figure 1:
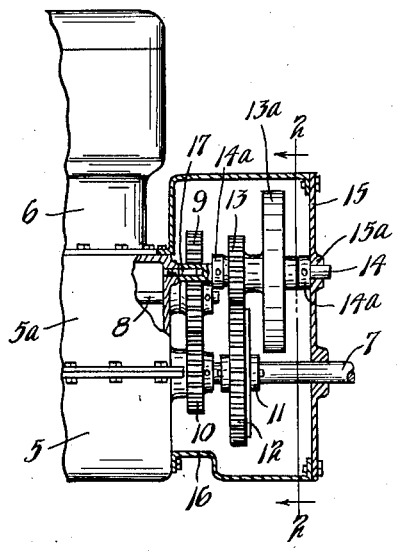
Fig. 1 is a view partly in side elevation and partly in vertical section, showing one end of an internal combustion engine with the invention applied thereto.
Figure 2:
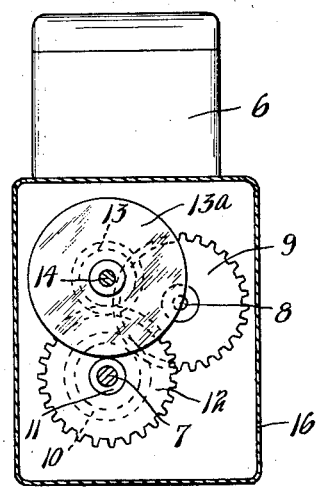
Fig. 2 is a vertical section taken on line 2—2 of Fig. 1, as indicated by the arrows.

Referring to the drawings, a portion of an internal combustion engine such as an automobile engine is shown, of which it will only be necessary to consider the crank case 5 having an upper portion $5^a$ to which the cylinder block 6 of the engine is secured, together with the crank shaft 7 of said engine. The valve cam shaft 8 of the engine is shown, having secured thereto a gear 9 driven by a gear 10 secured to the crank shaft 7.

Figure 3:
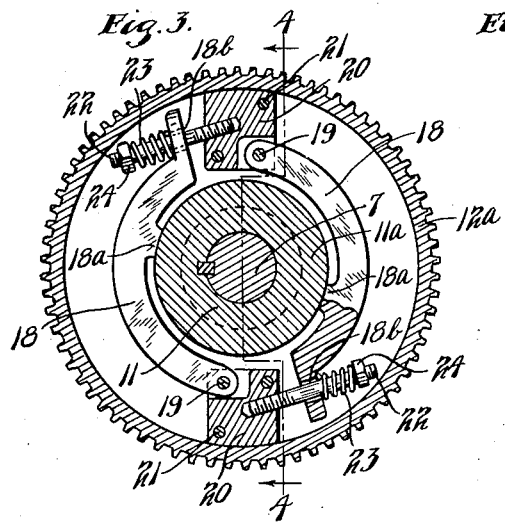
Fig. 3 is a vertical section taken on line 3—3 of Fig. 4.
Figure 4:
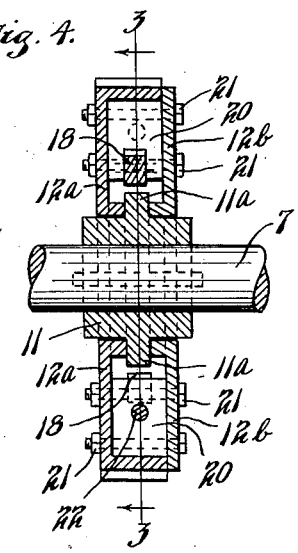
Fig. 4 is a vertical section taken on line 4—4 of Fig. 3.

In accordance with the present invention, a member 11 is provided, secured to the crank shaft 7 by any suitable means such as the key shown, which member 11 is cylindrical in form and has a central cylindrical rib $11^a$, which rib is embraced by the side portions $12^a$ and $12^b$ of the member 12 carried by the member 11, the portion $12^a$ being formed as a gear which meshes with the gear 13 journaled on a shaft 14, one end of which has a bearing in a boss $15^a$ formed on the cover plate 15 of the casing 16 enclosing the parts of the invention and other parts of the automobile, and which will ordinarily take the place of the valve gear casing on the automobile, said casing 16 being secured to the crank shaft casing 5. The gear 13 has a hub extending at one side thereof, to which is secured a weighted disk or fly wheel member $13^a$. The other end of the shaft 14 is bored and journaled on a pin 17 threaded into a boss on one end of the crank shaft cover $5^a$. The member 13 runs freely on the shaft 14 and is held in proper position thereon by the collars $14^a$ disposed on said shaft and pinned thereto at each side thereof. The projection $11^a$ on the member 11 is engaged at opposite sides by the projections $18^a$ on the arms 18, which arms are as shown in Fig. 3, arcuate in form, extending part way around member 11 and are pivoted at one of their ends on pins 19 carried in blocks 20 disposed at opposite sides of the member 12 and secured thereto by the headed and nutted bolts 21 passing through members $12^a$ and $12^b$ and through said blocks. It will be seen that the ends of arms 18 extend into recesses in the inner sides of the blocks 19. The arms 18 have radially projecting portions at their outer ends having apertures 18<sup>b</sup> therethrough and the rods 22 are threaded into the blocks 19 and pass through the apertures 18<sup>b</sup>. Springs 23 surround the rods 22 and bear at one end against the outer sides of the radial portions of the arms 18 and at their other ends against nuts 24 threaded on and adjustable on the outer ends of the rods 22. It will be seen that the member 12 is carried on the member 11 and rotates thereon and that the members 12<sup>a</sup> and 12<sup>b</sup> have inwardly extending cylindrical flanges at their inner sides engaging the projection 11<sup>a</sup> so that member 12 is properly positioned on the member 11. The teeth on the member 12<sup>a</sup> and on the member 13 are preferably formed to have some slight play or lost motion.

In operation the motor or engine is driven as usual and the crank shaft 7 is rotated. The member 11 moves with the crank shaft and owing to the frictional engagement of arms 18 with the member 11, the member 12 comprising the members 12<sup>a</sup> and 12<sup>b</sup> will be rotated and the gear 13 will be driven by the teeth on the member 12<sup>a</sup> so that the disk or fly wheel 13<sup>a</sup> will be rotated. The disk or fly wheel 13<sup>a</sup> will acquire considerable momentum as the engine runs at high speed. If now a torsional vibration should occur in the crank shaft, tending to cause a reverse movement of the crank shaft, the disk 13<sup>a</sup> will by its continued rotation in the same direction keep the member 12 rotating and the engagement of the arms 18 with the member 11 will tend to keep the crank shaft rotating in the proper direction and under torsional stress in this direction, so that torsional vibration is counter-acted. When the member 12 is running at high speed, the centrifugal force tends to throw the arms 18 outwardly against the tension of the springs 23 so that there is less frictional engagement between arms 18 and the projection 11<sup>a</sup>. Any reduction in speed, however, will allow the springs 23 to press the arms 18 inward with greater force, so that the arms 18 will always function quickly to counter-act any reverse tendency in the crank shaft due to the torsional vibration. The springs 23 can be adjusted as desired by the nuts 24 to give the desired frictional engagement between member 11 and arms 18. The torsional vibration occurs more frequently and is more frequent with long crank shafts or those having a large number of cranks, such as those used on the 6 and 8 cylinder engines. The crank shaft and the engine are thus kept running smoothly and with a minimum of vibration.

From the above description it is seen that applicant has provided quite a simple device for counter-acting the torsional strains and vibrations in the crank shaft and one that is very efficient. The device can readily be installed in a modern automobile and it is only necessary to slightly enlarge the valve gear casing. The device comprises very few parts and is easily operated and very durable.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. In a reciprocating engine, in combination with a crank shaft having a plurality of cranks, a member secured to said crank shaft, a rotatable member carried thereby, means for driving said rotatable member from said first mentioned member by friction varying inversely as the speed of said first mentioned member, and a rotatable weighted means driven by said rotatable member and operatively connected thereto.

2. A vibration damping means for the crank shaft of a reciprocating engine, having in combination, a member secured to said crank shaft, another member rotatable about said crank shaft, a swinging arm pivoted to said last mentioned member to centrifugally swing away from said first mentioned member, resilient means urging said arm into engagement with said first mentioned member, and a revoluble weighted member connected to said second mentioned member and rotated thereby.

3. A vibration damping means for a reciprocating engine, having in combination with the crank shaft of said engine having a plurality of cranks, a member secured to said crank shaft, a rotatable member carried by said member, a pair of oppositely disposed arms carried by said last mentioned member and pivoted thereto at one of their ends respectively, resilient means engaging said arms adjacent their other ends and urging the same into engagement with said first mentioned member against the outward centrifugal movement of said arms, whereby said second mentioned member is frictionally driven by said first mentioned member with a force inverse to the speed of said first mentioned member, said second mentioned member being formed as a gear, and a revoluble weighted member adjacent said crank shaft carrying a gear meshing with said gear.

4. The structure set forth in claim 3, said second mentioned member being formed as a hollow casing and said arms being disposed within said second mentioned member.

5. In a reciprocating engine, in combination with a crank shaft having a plurality of cranks, a cylindrical member secured to said crank shaft having a central circumferentially extending rib, an annular member carried by said first mentioned member and having side portions respectively engaging the side of said rib, blocks carried by said annular member, arms pivoted at one end to said blocks and partially encircling said first mentioned member and frictionally engaging the same, rods carried in said blocks and extending through apertures in the ends of said arms respectively, springs disposed on said rods and engaging said latter ends of said arms, and means engaging the other ends of said springs adapted to be moved to adjust the tension of said springs, said arms, springs and rods being inclosed between the sides of said second mentioned member.

6. A device for resisting reverse stresses in the crank shaft of a reciprocating engine, having in combination, a crank shaft having a plurality of cranks thereon, a rotatable member surrounding said crank shaft, means for driving said latter member from said crank shaft by friction inversely proportioned to the speed of said crank shaft, a second shaft driven by said rotatable member at a greater speed in said crank shaft, and a weighted means on said latter shaft.

7. A vibration damping means for a reciprocating engine having in combination, a crank shaft, a member rigidly secured to said crank shaft, an annular member surrounding said member, a centrifugally acting spring controlled means connecting said members to drive said annular member frictionally from said first mentioned member with a force inversely proportional to the speed of said first mentioned member.

In testimony whereof I affix my signature.
WILLIAM A. NELSON.